R. N. TRANE.
PRESSURE GAGE.
APPLICATION FILED JAN. 25, 1916.
1,195,750.
Patented Aug. 22, 1916.
Fig. 1.
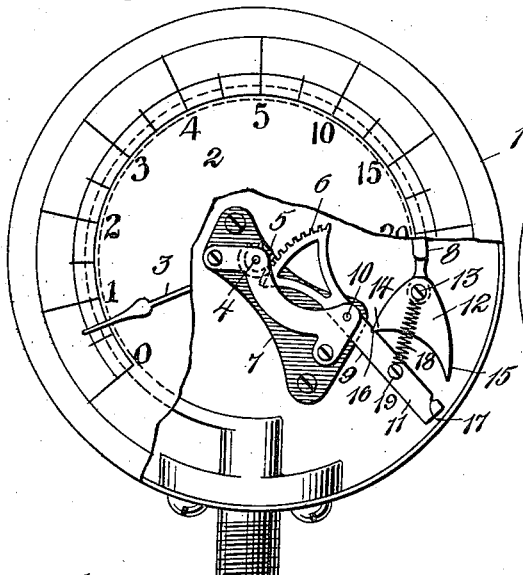
Fig. 2.
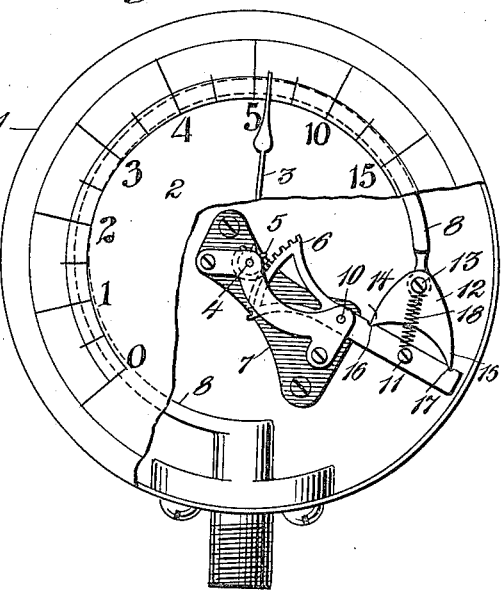
Fig. 3.
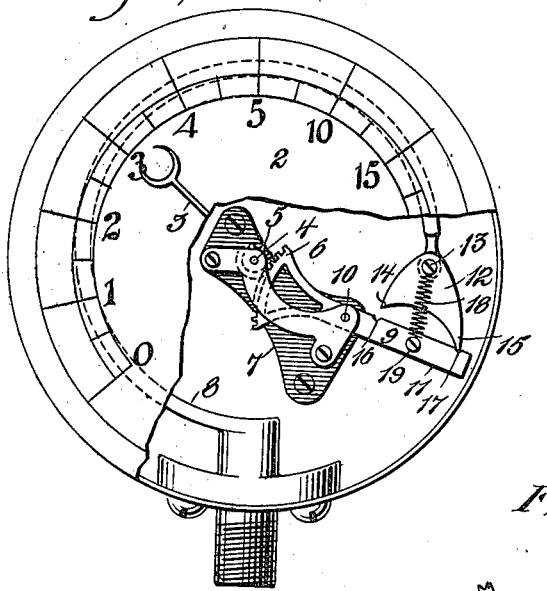
Fig. 4.
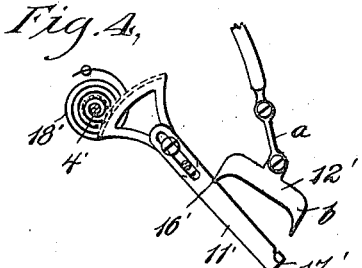
Fig. 5.
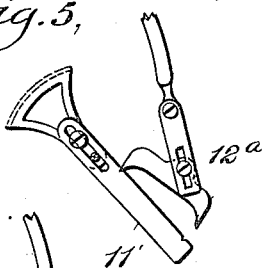
Fig. 6.
Fig. 7.
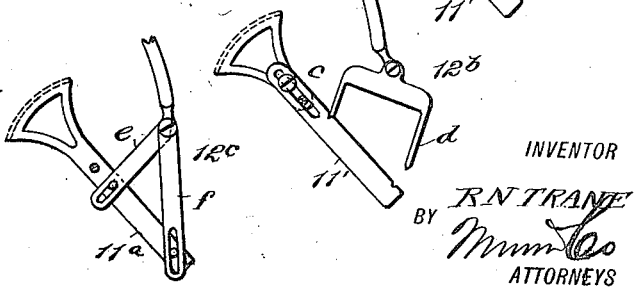
WITNESSES
Edw. Thorpe
C. Bradway
INVENTOR
R. N. TRANE
BY
Munn & Co
ATTORNEYS

UNITED STATES PATENT OFFICE.

REUBEN N. TRANE, OF LA CROSSE, WISCONSIN, ASSIGNOR TO THE TRANE COMPANY, OF LA CROSSE, WISCONSIN.

PRESSURE-GAGE.

1,195,750.　　　　　　　　Specification of Letters Patent.　　Patented Aug. 22, 1916.

Application filed January 25, 1916. Serial No. 74,111.

*To all whom it may concern:*

Be it known that I, REUBEN N. TRANE, a citizen of the United States, and a resident of La Crosse, in the county of La Crosse and State of Wisconsin, have invented a new and Improved Pressure-Gage, of which the following is a full, clear, and exact description.

This invention relates to pressure gages of the Bourdon tube type, and has to deal particularly with a mechanism whereby the pointer or needle has a variable motion for insuring accuracy of reading for low pressures.

The invention has for its general objects to improve and simplify the construction and operation of devices of the character referred to so as to be reliable and efficient in use, comparatively simple and inexpensive to manufacture, and so designed as to be adaptable to pressure gages of the usual type with minimum change in construction.

A more specific object of the invention is the provision of a variable connection between the free end of the Bourdon tube and the segment gear which operates the pointer shaft, whereby the effective connection between the pressure tube and segment automatically changes with the pressure so that the needle will have a wide range of movement over the dial for pressures say from zero to five pounds, and will have a comparatively short range of movement for increments of pressure beyond five pounds.

With such objects in view, and others which will appear as the description proceeds, the invention comprises various novel features of construction and arrangement of parts which will be set forth with particularity in the following description and claims appended hereto.

In the accompanying drawing, which illustrates certain embodiments of the invention and wherein similar characters of reference indicate corresponding parts in all the views, Figures 1, 2 and 3 are front views of a gage with portions of the dial broken away to show the operating connection between the pressure tube and the pointer shaft, the parts of the operating connection being shown in different positions from normal to maximum pressure; and Figs. 4 to 7 inclusive are detail views of modified forms of the operating connection between the pressure tube and the segment gear which rotates the pointer shaft.

Referring to the drawing, 1 designates a pressure gage casing, 2 the dial, 3 the pointer, 4 the pointer shaft, 5 the pinion thereon, 6 the segment gear fulcrumed in a frame 7 suitably fastened in the casing, the usual helical coiled spring for the shaft 4 being dispensed with, and 8 the Bourdon or pressure tube.

In carrying out the improvement, the segment gear 4 is a portion of a first class lever 9 which is fulcrumed at 10, and the arm 11 of the lever coöperates with a double link 12, which is pivotally connected at 13 with the free end of the pressure or Bourdon tube. The double link has spaced extremities 14 and 15 that are adapted to engage respective recesses 16 and 17 in the edge of the lever arm 11, the recesses being disposed at different radial distances from the fulcrum 10. A helical extension spring 18 is connected at one end with the pivot 13, and at the opposite end with the lever at the point 19 which lies between the notches 16 and 17. This spring maintains the lever in contact with either or both of the extremities 14 and 15 of the double link, and by means of the link and spring the Bourdon tube has an effective operative connection at variable points with the lever. When the pressure is active in the tube 8, as in Fig. 1, the operative connection between the tube and lever is close to the fulcrum 10, so that comparatively small increments of movement of the free end of the tube will cause great movement of the needle over the dial until a pressure of about five pounds is reached, when the effective point of connection between the tube and lever will be shifted outwardly and lie between the points 14 and 15 of the double link, which are now both in contact with the lever. Beyond this point the increase in pressure causes but a slow movement of the pointer or needle 3, because the effective point of connection between the tube and lever 11 shifts still farther outwardly from the fulcrum 10, with the result that the continued movement of the free end of the lever produces only slight movements of the pointer over the dial from five pounds to the maximum limit. As the pressure lowers, the parts shift from the position shown in Fig. 3 to that shown in Fig. 1.

In the modification shown in Fig. 4 the arm 11' of the lever is adjustable with respect to the segment gear so as to change the position of the notches 16' and 17', and the double link 12' is made in two parts *a* and *b*, the part *a* being bendable so as to provide for ready adjustment for properly relating the free end of the pressure tube with the lever. In this and the following modifications the spring 18 is dispensed with and the coiled spring 18' acts on the shaft 4' in such a direction as to maintain the lever arm in contact with the double link.

In Fig. 5 the double or oscillatory link 12$^a$ is adjustable as to effective length and to any angle with respect to the lever, whereas in Fig. 6 the double link 12$^b$ has bendable members *c* and *d* which can be bent to change their effective length and bring their free ends into proper relation with the lever 11'.

In Fig. 7 the double link 12$^c$ has two angularly disposed members *e* and *f* which are connected by slot and pin connections with the lever 11$^a$, all of which modifications produce the same ultimate result, that of varying the points of effective operative connection between the pressure tube and the segment lever, whereby relative movement of the pointer with respect to the movement of the tube is changed.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. In a pressure gage, the combination of a dial, a pointer, a pressure responsive element, a pivoted member operatively connected with the pointer to move the same, a double link pivotally mounted on the pressure responsive device and adapted to have a shiftable effective connection with the lever to change the range of movement thereof for corresponding increments of movement of the pressure responsive device, and means for yieldingly holding the lever and double link together.

2. In a pressure gage, the combination of a dial, a pointer, a pressure tube, a lever operatively connected with the pointer to move the same, and shiftable connecting means between the tube and lever, whereby the relative lengths of the arms of the latter are progressively changed with the changing of the tube.

3. In a pressure gage, the combination of a dial, a pointer, a lever operatively connected with the pointer for actuating the same, a Bourdon tube, an oscillatory member on the free end of the tube and having spaced points adapted to engage with the lever both or one at a time according to the degree of pressure in the tube, and means for yieldingly holding the lever and member together.

4. In a pressure gage, the combination of a dial, a pointer, a lever operatively connected with the pointer for moving the same, a pressure tube, and means for connecting the free end of the tube at variable points with the lever as the pressure in the tube varies, said means comprising a member pivotally connected with the tube and having points adapted to contact with the lever, said points being adjustable as to the point of connection with the lever to properly relate the free end of the tube to the latter, and means for yieldingly holding the lever in contact with the member.

5. A pressure gage comprising a dial, a pointer movable thereover, a pinion connected with the pointer, a segment gear meshing with the pinion, a lever on which the segment gear is carried, said lever having seats arranged respectively at different distances from the fulcrum, a pressure tube having a free movable end, a member having spaced points, means for pivotally mounting the member on the free end of the tube in such relation to the seats of the lever that the said points of the member can engage the seat simultaneously, or one point will engage one seat while the other is disengaged from the other seat, according to the degree of pressure in the tube, and means for yieldingly holding the lever and one or both points of the member in contact.

6. A pressure gage comprising a dial, a pointer movable thereover, a pinion connected with the pointer, a segment gear meshing with the pinion, a lever on which the segment gear is carried, said lever having seats arranged respectively at different distances from the fulcrum, a pressure tube having a free movable end, a member having spaced points, means for pivotally mounting the member on the free end of the tube in such relation to the seats of the lever that the said points of the member can engage the seats simultaneously, or one point will engage one seat while the other is disengaged from the other seat, according to the degree of pressure in the tube, and an extension spring connected with the free end of the tube and with the lever for maintaining the latter in contact with the point or points of the said member.

7. A pressure gage comprising a dial, a pointer movable thereover, a pinion connected with the pointer, a segment gear meshing with the pinion, a lever on which the segment gear is carried, said lever having seats arranged respectively at different distances from the fulcrum, a pressure tube having a free movable end, a member having spaced points, means for pivotally mounting the member on the free end of the tube in such relation to the seats of the lever that the said points of the member can engage the seats simultaneously, or one point will engage one seat while the other is disengaged from the other seat, according to the degree of pressure in the tube, and means for yieldingly holding the lever and one or both points of the member in contact, said lever being adjustable longitudinally for changing the position of the seats with respect to the said member.

In testimony whereof I have signed my name to this specification in the presence of two subscribing witnesses.

REUBEN N. TRANE.

Witnesses:
T. D. BENNETT,
F. J. SRIES.